Figure 10:
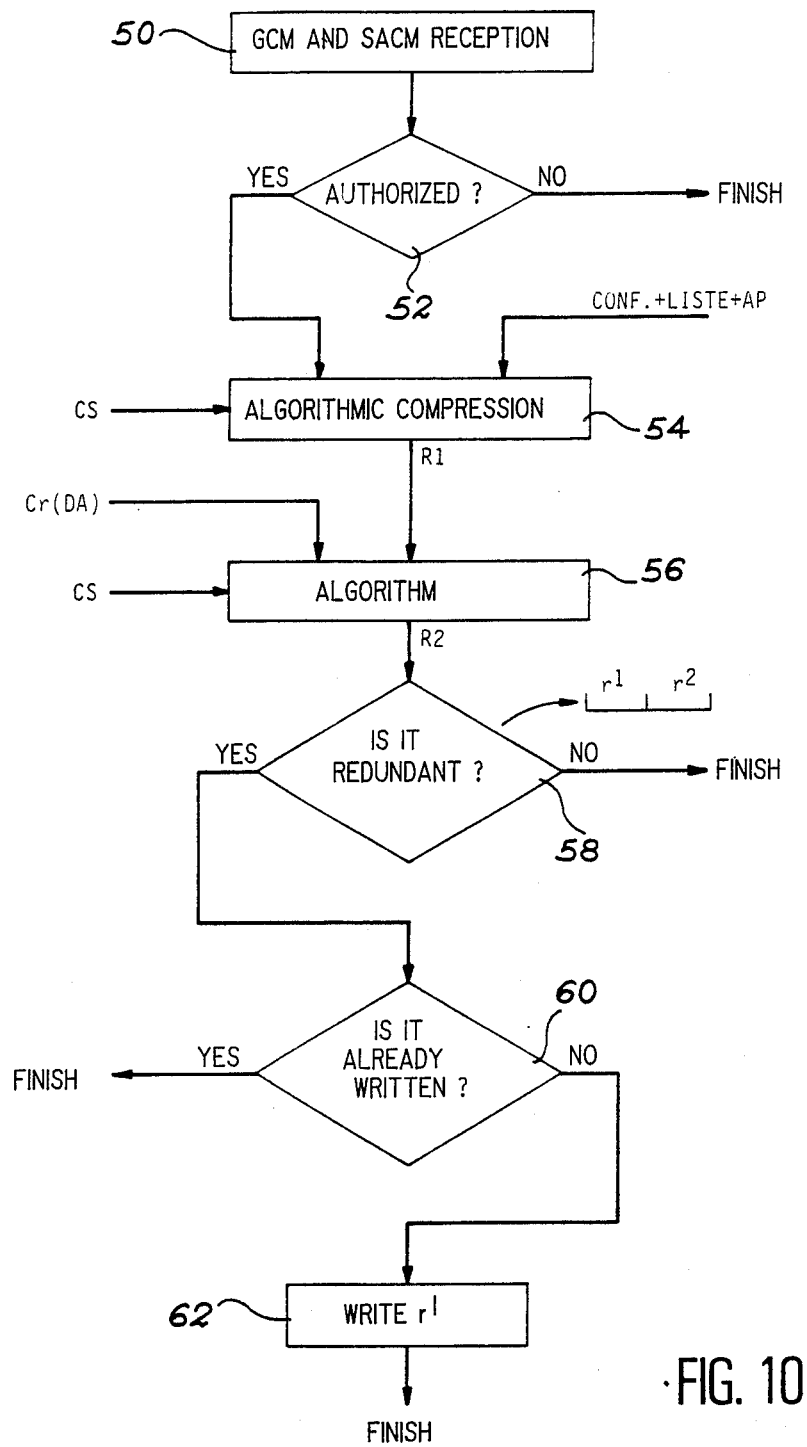

United States Patent [19]

Guillou et al.

[11] Patent Number: 4,947,428

[45] Date of Patent: Aug. 7, 1990

[54] PROCESS FOR THE BROADCASTING AND RECEPTION OF ACCESS TITLE CONTROL MESSAGES

[75] Inventors: Louis Guillou, Bourgbarré; Joseph Blineau, Renees; Françoise Coutrot; Vincent Lenoir, both of Sevigne, all of France

[73] Assignees: Etat Francais, represente par le Ministere des Postes, des Telecommunications et de l'Espace (C.N.E.T.), Issy les Moulineaux; Telediffusion de France S.A., Paris, both of France

[21] Appl. No.: 350,793

[22] Filed: May 12, 1989

[30] Foreign Application Priority Data

May 27, 1988 [FR] France .................... 88 07087

[51] Int. Cl.$^5$ ............................................. H04K 1/00
[52] U.S. Cl. .................................... 380/20; 380/13
[58] Field of Search .............................. 380/20, 13

[56]  References Cited

U.S. PATENT DOCUMENTS 4,253,114  2/1981  Tang et al. .................... 380/20
4,292,650  9/1981  Hendrickson .
4,864,614  9/1989  Crowther ....................... 380/20

FOREIGN PATENT DOCUMENTS 0021938   2/1984  European Pat. Off. .
0127381  12/1984  European Pat. Off. .
0155762   2/1985  European Pat. Off. .

Primary Examiner—Thomas H. Tarcza
Assistant Examiner—David Cain
Attorney, Agent, or Firm—Oblon, Spivak, McCelland, Maier & Neustadt

[57] ABSTRACT

According to the invention, the control messages are constituted by a general addressing message (GCM), followed by shared addressing messages (SACM). The message (GCM) contains all the information common to all the user groups and a confirmation data item of the group of users and the messages (SACM) a shared address. Thus, the group is defined in a manner inherent in the control messages and can undergo reconfiguration at any time.

Application to more particularly satellite broadcasting of television programmes.

12 Claims, 3 Drawing Sheets

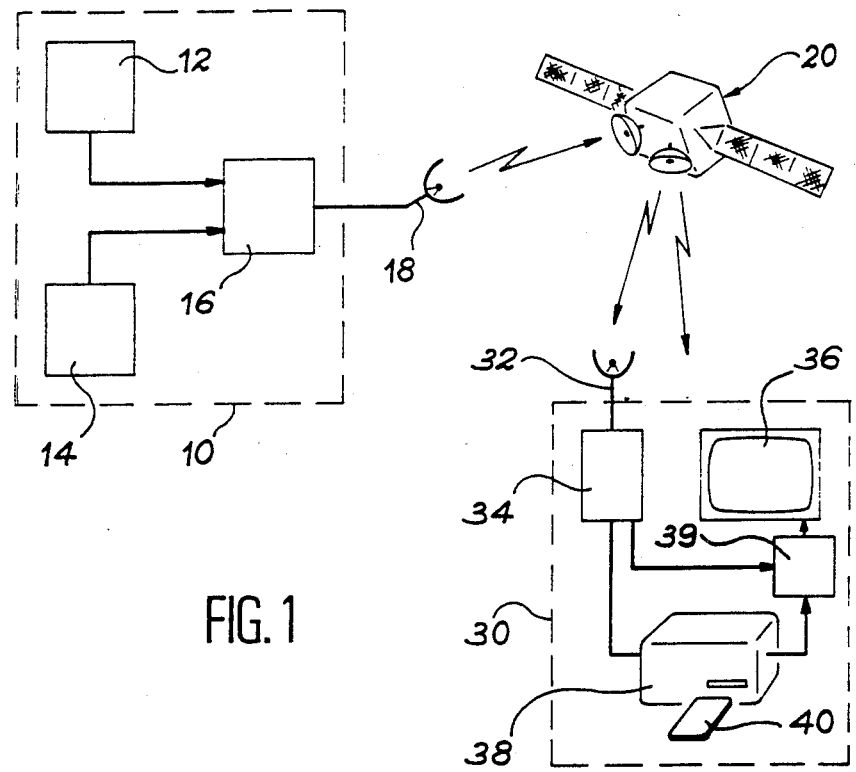
FIG. 1
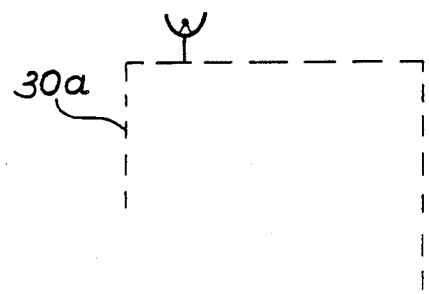
FIG. 2
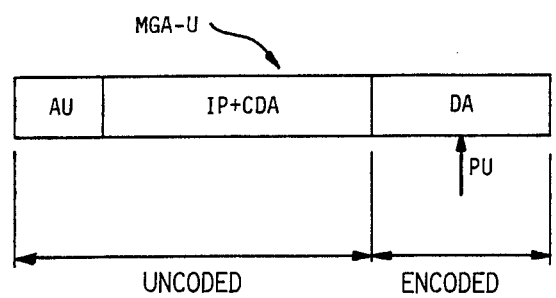

FIG. 3
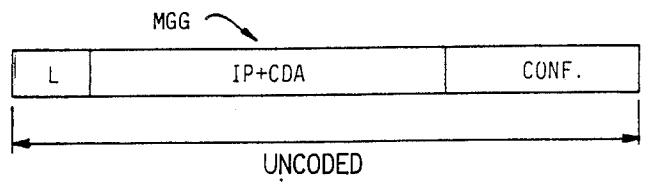
FIG. 4
FIG. 5
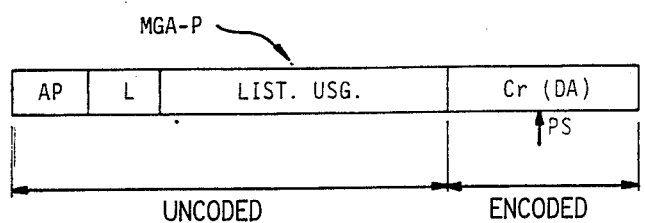
FIG. 6
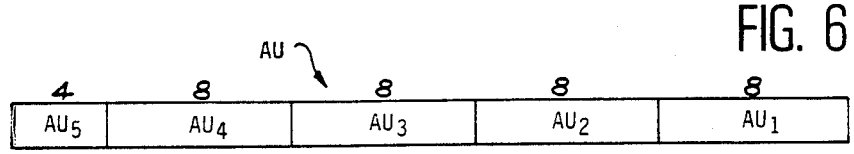
FIG. 7
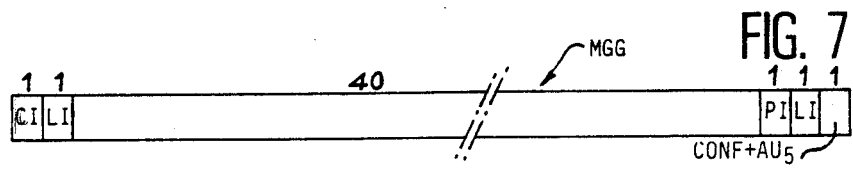
FIG. 8
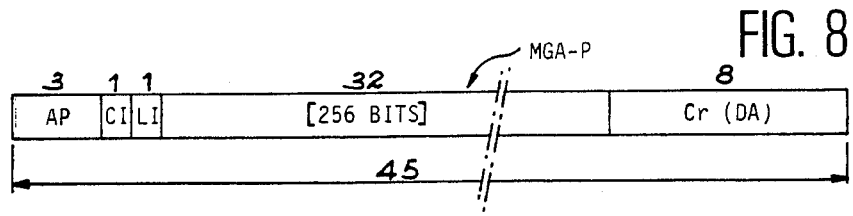
FIG. 9
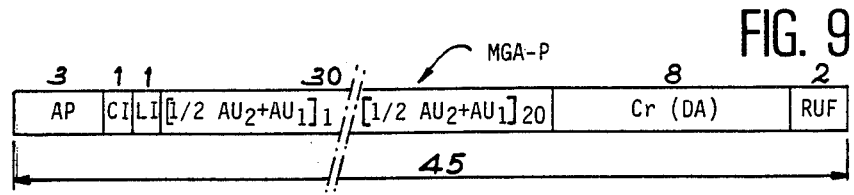

PROCESS FOR THE BROADCASTING AND RECEPTION OF ACCESS TITLE CONTROL MESSAGES

DESCRIPTION

The present invention relates to a process for the transmission or broadcasting of access title, heading or caption control messages and a process for the reception of the thus broadcast messages.

Certain television programme broadcasting networks operate on the principle of garbling a programme on transmission and ungarbling the message received under the control of an access title.

FIG. 1 diagrammatically shows the organization of such a network in the case of satellite broadcasting. The extension to a distribution network by cables or radio broadcasting is immediate.

In a single transmission centre 10 is provided a programming unit or scheduler 12 constituting a televised message, a control circuit 14 constituting checking and control messages for the access titles and a transmitter 16 connected to an antenna 18. A satellite 20, e.g. of the geostationary type, receives the transmitted wave, amplifies it and retransmits it in the direction of earth.

A plurality of receivers 30,30a, etc., are equipped with an antenna 32, a reception circuit 34 separating the garbled video signal from the checking and control signals, a decoder 39 receiving the former and a conditional access device 38 the latter. The conditional access device supplies the decoder 39 with a check word necessary for the ungarbling of the signal received, which is then supplied to the television receiver 36. The conditional access device 38 receives a security processor containing the access title or titles corresponding to the various broadcast programmes. As a function of the construction, the security processor can be embedded in the conditional access device or can be detachable, namely of the chip card or smart card type.

In order to obtain access to a protected programme, it is necessary for the conditional access device to be able to exploit one of the access title check message systems accompanying the garbled programme. In general, each access title check message system has three fields, namely an identifier of the service key to be used, a parameter defining the access conditions to be satisfied in order to have the right of using said service key and a cryptogram for the check word. A fourth, so-called redundancy field can be advantageously added, so that the security processor cannot be used outside the intended context.

When the security processor contains an appropriate access right, i.e. when it has the service key indicated by the identifier and said key is provided with a status compatible with certain of the conditions indicated by the parameter, the security processor decodes the cryptogram in order to reconstitute the check word. The latter enables the decoder to ungarble the components of the programme.

In order to modify an access right, it is necessary to exploit a control message system for the access titles. Said system is prepared by the scheduler and must not be imitatable or falsifiable by users.

The security processor of a user offers the scheduler two relatively different control means:

crypto-writing making it possible to distribute a new service key, which essentially constitutes a confidentiality and handling of secrets mechanism, crypto-valorization, which makes it possible to modify the use status of a service key, which is already in the security processor, this essentially constituting an integrity and signature mechanism.

The chip cards of the key-carrier type PC1 have these two secured mechanism. The card then uses a distribution key individual to it and which can be reconstituted by check processors (parent cards or modules). The parent processor which has reconstituted the distribution key of the daughter card of the user, on the basis of a basic secret and a diversification data item unique to said card (e.g. the serial number of the chip or, in the case of the invention to be described hereinafter, a user address with respect to the scheduler), then calculates a cryptogram.

The card of the user decodes the cryptogram in order to examine the result. When the daughter card has detected the provided redundancy (e.g. the result repeats a 32 bit pattern) considers that it is in the presence of its master and therefore carries out the orders given to it by the parameter transmitted in uncoded form (which participates in the calculation) and by the result (which gives a secret word to be written).

The key holder cards PC1 provide for the systematic use of these mechanisms for writing any new secret (in particular a key) and for controlling the rights attached to these keys. The title control message system is then individualized and rendered personal for a single user.

Although this method is effective for controlling cards calling a control server across an interactive network, e.g. with a Minitel equipped with a memory-equipped card reader, it is not very satisfactory for controlling users via a broadcasting or distribution network using cables with a tree-like structure.

Thus, the transmission of individual messages requires a high information flow. Thus, FIG. 2 shows what can be the structure of such a single addressing control message. It starts with a field AU having the single address of the intended user, a field IP+CDA corresponding to the identification of the programmer and the characterization of the access right and finally a third field DA corresponding to the value of the access right to be written or modified in the access title of the user. The data of the first two fields are transmitted in uncoded form, whilst the data of the third field are either also transmitted in uncoded form, or are encoded by a single programmer key PU.

Such a message must be repeated prior to the broadcasting of a given programme for the same number of times as there are users requiring an access right to said programme.

Patent application PCT WO 85/00491 entitled "Encrypted Broadcast Television System" proposes reducing said flow by sharing the access title control messages among several users. For this purpose, a shared key is distributed beforehand to all the members of a group of users by a massive supply of individual addressing messages.

However, this solution suffers from disadvantages. The constitution of a group is static, i.e. is artificially defined beforehand outside the actual messages. This presupposes that the behaviour of users is uniform with respect to the acquisition of access rights. When the regrouping becomes ineffective as a result of an excessive disparity in the requests of users, a redefinition of the group becomes necessary and once again there is a massive supply of individual addressing messages. Thus, in such a system time is spent controlling keys and not rights.

The object of the present invention is to obviate these disadvantages. To this end, the invention proposes another way of sharing the access right control messages. It is based on the philosophy of key holder cards according to which, in order to modify the state of a user, it is merely necessary to modify the use status of a service key in the security device of the user. Thus, instead of controlling these keys, there is then a control of the user rights of a key. In order to modify the status of a few users, it is merely necessary to address these users and without disturbing the others.

On analysing information contained in an individual message (cf. FIG. 2), the following finding can be made. Part of the message is specific to the user (it consists of the single address AU) and part of the message is common to all users which have subscribed to the same access right. For such common information, some of the information is in uncoded form (identification of the scheduler and characterization of the access right) and can naturally be shared, whereas the others are encoded (the value of the access right) and, in the case of an individual message, such information is specific to a user as a result of using a single scheduler key.

The originality of the inventive process is a result of taking advantage of this analysis for bringing about a maximum sharing of the elements common to the different users. The process according to the invention is based on the introduction of two new types of messages:

(a) general use control messages (GCM for short), which can be interpreted by all users and which contain information common to all the users who have been authorized. These GCM messages describe the general characteristics of access rights which have been validated, as well as the identification of the scheduler. They also define the rule according to which the users are to be regrouped. Finally, these GCM messages contain a link information permitting their unambiguous correlation with the messages which are to follow. The frequency of transmission of these GCM messages is very low and in theory it is sufficient to transmit one single message upstream of the group of validation messages of the groups of users. However, for reasons of the engagement and possible resynchronization times, it is desirable to transmit at a slow, but regular rate of typically one message per second.

(b) Shared addressing control messages (SACM for short) are specific to a group of users, the regrouping having been defined in the preceding GCM message. The group of users shares an address AP appearing at the top of the SACM message and enables the group of users to filter the adequate message intended for it. The information necessary for the description of the value of the access right can be contained in the SACM message and can be encoded by the service key of the scheduler. This SACM message contains a description of all the users in the group authorized to acquire this common access right and this latter description also appears in uncoded form. The security element controlling the messages linked with the conditional access, receiving a GCM message and then a SACM message relating to it, checks that he is authorized to acquire the access right and, in the affirmative, decodes the information linked with the access right (if the latter has been encoded) so as to be able to deduce therefrom the value to be stored.

Decoding (if applicable) utilizes the service key common to all the users, as well as all the parameters in uncoded form qualifying the access right, the programming unit and the group. This is in order to prevent any fraudulent pre-manipulation of the uncoded parameters with a view to obtaining a more favourable situation for the user. The final result, which represents the access right, must have a certain redundancy in order to ensure the validity of the calculation and eliminate chances of success in the manipulation of data.

It is now necessary to define how the dynamic, real time calculation of the shared address AP of a user takes place as a result of the reception of a GCM message. The shared address AP appears as a subset of the single or unique address AU. The elements of the latter constituting the shared address AP are defined in the GCM message and there is consequently no fixed grouping of users. This constitutes an original and important element of the inventive process compared with the aforementioned known solution.

The access right is not necessarily coded and can be transmitted in uncoded form. It is also not necessarily in the SACM message and could also be in the GCM message.

The invention is described in greater detail hereinafter relative to non-limitative embodiments and the attached drawings, wherein show:

FIG. 1, already described, diagrammatically a television programme broadcasting network.

FIG. 2, already described, the structure of a prior art individual addressing message.

FIG. 3 the general structure of a control message.

FIG. 4 the general structure of a general use control message.

FIG. 5 the general structure of a shared addressing control message.

FIG. 6 the digital structure of a single address.

FIG. 7 an example of a general use control message.

FIG. 8 a first example of a shared use control message.

FIG. 9 a second example of a shared use control message.

FIG. 10 a flowchart showing the operations performed in the security device of a user.

In the following description, it is assumed that the message characterizing the access right is located in SACM and is coded. However, this is not limitative.

The first step according to the invention is to index or list the users of the audience having subscribed to the same access right. This is followed by the definition of a group including the users having subscribed to the same access right. For this group, the address of each user can be considered as including a shared address belonging to all the users of the group and a unique or single subaddress defining the said user within the group.

This is followed by the formation and broadcasting or transmission of a control message, whose structure is illustrated in FIG. 3. It comprises at the top a general use control message GCM and then one or more shared addressing control messages SACM, SACM', etc. It is possible to rebroadcast the GCM and then the SACM messages.

The structure of a general use control message is illustrated in FIG. 4 and comprises:

a link information (L), a first digital field containing information common to all the users of the audience, said information identifying the scheduler service (IP) and characterizing the access right to be validated (CDA), a second field defining a confirmation of a group of users (CONF).

All the data of these two fields are broadcast in uncoded form.

The structure of a shared addressing control message is illustrated in FIG. 5 and comprises:

the shared address of the user group (AP), whose organization is specified by the confirmation information (CONF) contained in the preceding general use control message, said address being transmitted in uncoded form, a link information (L), a field defining the list of users belonging to the group aimed at for which an access right has to be written, said information being transmitted in uncoded form, a field containing, in the illustrated variant, a cryptogram Cr(DA) defining the common value of the access right, said cryptogram being obtained by introducing a redundancy and then an encoding algorithm using the service key and a parameter.

It should be noted that according to the invention the definition of the group is inherent in the actual message, as a result of the confirmation information (CONF) of the general use message and the shared address (AP) of the following shared addressing control message. Such a group can undergo reconfiguration as a function of each common access right to be written, by modifying the confirmation information and the shared address.

Unlike in the case of the prior art regrouping process which is "static" or "extrinsic", it can be said that the regrouping according to the invention is "dynamic" or "intrinsic".

A more detailed description will now be given of an embodiment in the case of satellite broadcasting and in this case the transmission format is clearly defined. The information is transmitted in packet form. The number of useful data per packet is 45 bytes for the messages linked with the conditional access, in view of the error detection and correction mechanisms used. Moreover, the number of bytes constituting the definition of AU and AP is also defined, being respectively 4.5 and 3 bytes.

FIG. 6 shows the structure of a single or unique address AU, which comprises four bytes $AU_1$, $AU_2$, $AU_3$ and $AU_4$ and a half-byte (or nibble) $AU_5$. In reality, $AU_5$ only changes for addressing capacities higher than 4000 million.

As the shared address AP must be 3 bytes, there are at least five ways of extracting 3 bytes from among 4.5, so that it is e.g. possible to have:

|       | $AU_4$ | $AU_3$ | $AU_2$ |         |
|       | $AU_4$ | $AU_3$ | $AU_1$ |         |
|       | $AU_4$ | $AU_2$ | $AU_1$ |         |
|       | $AU_3$ | $AU_2$ | $AU_1$ |         |
| $AU_5$ | $AU_4$ | $AU_3$ | ½     | $AU_2$  |

The four first organizations can be identified by four bits designating the selected bytes. Thus, the following confirmation nibbles (CONF) are obtained:

| 1 | 1 | 1 | 0 |
|---|---|---|---|
| 1 | 1 | 0 | 1 |
| 1 | 0 | 1 | 1 |
| 0 | 1 | 1 | 1 |

For the fifth confirmation, it can be appropriately identified by the nibble CONF=0 0 0 0.

The first four shared address confirmations affects all the users having in common the three bytes of AP, i.e. all the users having in their single address a random value of the byte not appearing in AP (for a given value of $AU_5$). In other words, virtually 256 users are addressed. 4096 users are regrouped for the fifth confirmation.

The organization into 45 bytes of general addressing control messages GCM and shared addressing control messages SACM is illustrated in FIGS. 6 to 8.

In FIG. 7, the GCM signal comprises a first byte CI containing the link information, a second byte LI for defining the length of the GCM message and 43 bytes identifying the scheduler and characterizing the access right, a byte PI designating the organization of the group, a byte LI of value 01 and finally a byte formed from a nibble defining the confirmation (CONF) and the nibble $AU_5$.

FIGS. 8 and 9 illustrate two different structures of the shared addressing control message in the case of regrouping 256 and 4096 users.

In FIG. 8, the message comprises the shared address AP with 3 bytes, a byte CI, whereof one bit contains the link information, a byte LI and then a field of 32 bytes containing 256 bits making it possible to describe, for each of the 256 users whose group address is $AU_5+AP$, the authorized state (1) or unauthorized state (0) for the following access right, and finally an 8 byte field describing the access right. This latter field, in the described variant, is encoded by the service key, i.e. the cryptogram Cr(DA) of the access right.

The 8 bit address field resulting from the operation $AU-(AU_5+AP)$ of each user makes it possible to point to the desired bit of the 256 bit field. This address field is immediately defined by the nibble CONF, because it corresponds to the 0 of said nibble indicating the unused byte in the shared address. Thus:

to CONF = 1 1 1 0 corresponds $AU_1$
to CONF = 1 1 0 1 corresponds $AU_2$
to CONF = 1 0 1 1 corresponds $AU_3$
to CONF = 0 1 1 1 corresponds $AU_4$ FIG. 9 illustrates the structure of a SACM message for a regrouping of 4096 users corresponding to a confirmation of type 0 0 0 0. The first five bytes are identical to those of FIG. 8, but the address field on this occasion comprises 30 bytes constituting 20 addresses of form $[½AU_2+AU_1]$. A user of the group defined by AP will not be authorized, for the access right defined hereinafter, except when one of the 20 addresses defined in the message is such that:

$$AU=AP+[½AU_2+AU_1]_i.$$

The message continues with 8 bytes of the access right cryptogram and terminates with an unused 2 byte field RUF.

The effectiveness of one or other organization is dependent on the nature of the access right. In the case of subscription, the regrouping structure of 256 users is more effective. In the case of payment on transmission with anticipated choice, the other type of organization can be more effective if the requests formulated do not easily apply to the regrouping by 256.

The above description relates to a sharing of the single or individual addresses of the users, but the invention is not limited thereto. It also applies to the case of single scheduler addresses (AUP), which can be subdivided into a shared part and a subaddress.

If this single scheduler address is constituted by 28 bits, it can be subdivided into a part with 8 least significant bits ($AUP_1$) and a part with 20 most significant bits ($AUP_2$). The shared address will be constituted by the 20 most significant bits, supplemented by 4 bits at 0 to obtain 3 bytes. The confirmation signal will then be of form CONF=1 1 1 1 with, additionally, 4 non-significant bits. The signal CONF=1 1 1 1 indicates that the subaddress is constituted by the least significant byte $AUP_1$.

The broadcasting of the various control messages has now been described, so that it is now necessary to define the process for receiving these messages. FIG. 12 illustrates the flowchart used in the user security device. This process comprises the following operations:

the messages (operation 50) are received with their general use control message part GCM containing the group confirmation signal (CONF) and their shared addressing message parts SACM containing the shared address (AP), the list of users and the cryptogram Cr(AD), a check is made to establish whether the single address of the user (AU) corresponds to the group defined by the shared address (AP) and the list of users in this group (operation 52), in the affirmative, a first compression algorithm (operation 54) is implemented using the service key CS, in order to extract a parameter R1 from the data carried by the general use message and the shared use message, a second algoritm (operation 56) is implemented using the service key CS and the parameter R1, said algorithm being applied to the cryptogram Cr(DA) defining the value of the access right giving a result R2, a check is made to establish whether the result R2 has the redundancy introduced on transmission during the realization of the cryptogram (operation 58), from result R2 is drawn the value r1 of the access right to be written and an examination is made to establish whether r1 is or is not already written (operation 60), in the negative, said access right is written in the title (operation 62).

In more general terms, it is not necessary to combine the processing of the redundancy and the coding/decoding as in the variant described hereinbefore.

It is firstly possible to implement a redundancy processing to guarantee the authenticity of the message system. When the device does not find the expected redundancy, it stops the flow of the internal operations and becomes blank. In order to reactivate the device, resetting is necessary. When the device finds the expected redundancy, it continues the flow of its internal operations and implements the coding/decoding processing.

We claim:

1. Process for the broadcasting of access title control messages conditional on broadcast programmes, said titles being held by users forming an audience, a single digital address being allocated to each user, the broadcast programmes being garbled by a service key, said key being held by all users, the access to such a programme being linked with a use status of the service key, said process being characterized in that, for writing an access right in certain titles, it comprises the following operations:
   (a) there is a listing of the users of the audience which have subscribed to the same access right,
   (b) a definition is made of a group including the users having subscribed to said same access right, said user group having the feature of an address with a common part, called a shared address, the address of each user thus being constituted by the shared address belonging to all users of the group and a single subaddress defining this user within the group,
   (c) a general use control message (GCM) is broadcast and is more particularly constituted by:
      a link information,
      a first digital field containing an information common to all the users of the audience, said information identifying the scheduler service and characterizing the access right to be validated,
      a second field defining a group confirmation, all the data of said two fields being broadcast in uncoded form,
   (d) following said general use control message (GCM) is broadcast at least one shared addressing control message (SACM), which comprises:
      the shared address of the group of users is specified by the confirmation information contained in the preceding general use control message, said address being transmitted in uncoded form,
      a link information,
      a field defining the list of users belonging to the group aimed at for which an access right has to be written, said information being transmitted in uncoded form,
   (e) a field containing a common value of the access right is introduced into any one of the messages (GCM or SACM),
   (f) a redundancy is formed, which guarantees the authenticity of the message,
   (g) a group of users has thus been intrinsically defined by the actual access title control message, as a result of the confirmation information of the general use message and the shared address of the shared addressing control message which follows, said group being modifiable as a function of each common access right to be written through the modification of the confirmation information and the shared address.

2. Process according to claim 1, characterized in that the field containing the common value of the access right is in the shared addressing message (SACM).

3. Process according to claim 1, characterized in that the information containing the common value of the access right is encoded by an encoding algorithm using the service key and a parameter for forming a cryptogram Cr(DA).

4. Process according to claim 3, characterized in that the cryptogram defining the common value of the access right contains said redundancy.

5. Process according to claim 1, characterized in that each single address is constituted by 36 bits organized in 4 bytes (UA1, UA2, UA3, UA4) and one nibble (UA5).

6. Process according to claim 5, characterized in that the group confirmation signal (CONF) is constituted by a nibble having 3 bits at 1 and 1 bit at 0 and by a nibble (UA5), the shared address comprises 24 bits corresponding to 3 of the single address bytes specified by the bits at 1 of the confirmation signal, the single subaddress comprises the byte not used in the shared address, so that the group has 256 users, the address field contained in the shared message is constituted by 256 bits at 1 or 0, as a function of whether the corresponding user is or is not authorized to use the access right broadcast in said message.

7. Process according to claim 5, characterized in that:

the group confirmation signal is constituted by a nibble, whereof all the bits are at 0, followed by a non-significant nibble, the shared address is constituted by the nibble (UA5), the bytes UA4 and UA3 and the four most significant bits of byte UA2, the group comprises 4096 users, the address field of the shared message comprises 20 single subaddresses, each designating a user for whom is intended the broadcast access right, the subaddresses are constituted by 12 bits corresponding to the 4 least significant bits of the byte (UA2) and to the eight bits of the byte (UA1).

8. Process according to claim 1, characterized in that each single address is constituted by a single address of the 28 bit scheduler (PPUA) incorporating a byte PPUA1 and a group of 20 bits (PPUA2).

9. Process according to claim 5, characterized in that:

the group confirmation signal (CONF) is constituted by 4 bits at 1, followed by 4 non-significant bits, the shared address comprises a nibble at 0 and the 20 most significant bits of the single address of the scheduler, the group comprises 256 users, the address field of the shared control message is constituted by 256 bits at 1 or 0, as a function of whether the corresponding user is or is not authorized to use the access right broadcast in said message.

10. Process for the reception and processing of access title control messages conditional on broadcast programmes, said messages having been broadcast according to the process of claim 1, characterized in that it comprises the following operations for each user of the audience:

(a) the said messages are received, with their general use control message (GCM) containing the group confirmation signal and with their shared address control messages (SACM) containing the shared address, the list of users with the information corresponding to the access right, (b) a check is made to establish whether the single address of the user corresponds to the group defined by the shared address and the list of users in said group, in the affirmative, a first compression algorithm is implemented using the service key, in order to extract a parameter (R1) from the data carried by the general use message and the shared use message, a check is made to establish whether the access title control message received has the redundancy introduced on transmission, the value is taken from the access right to be written, the access right is written in the title.

11. Reception and processing process according to claim 10, characterized in that the information relating to the access right have been encoded in the form of a cryptogram of the access right, so that a second algorithm is implemented using the service key and the parameter (R1), said algorithm being applied to the cryptogram of the access right.

12. Reception and processing process according to claim 11, characterized in that the second implemented algorithm gives a result R2 and a check is made to establish whether said result gives the expected redundancy and from R2 is then taken the value (r1) of the access right to be written.

* * * * *